Patented Jan. 16, 1951

2,538,606

UNITED STATES PATENT OFFICE 2,538,606

SPEED BAROMETRIC ALTITUDE AND AIRPLANE ACCELERATION RESPONSIVE FUEL CONTROL

Stanley M. Udale, Detroit, Mich., assignor to George M. Holley and Earl Holley

Application May 11, 1945, Serial No. 593,214

1 Claim. (Cl. 60—41)

This application is a continuation in part of my copending application, Serial No. 582,266, filed March 12, 1945.

The object of this invention is to control the fuel supply of an engine by the density of the air and the speed of the engine. These devices are known as speed/density fuel supply devices. If such a device is installed on an airplane engine and if the airplane is dived, the increase in air density during the dive causes the engine to overspeed, and it is desirable therefore to restrict the fuel supply temporarily during the acceleration period and to allow the fuel supply to gradually increase to the desired amount after the plane has leveled off and the dive is over.

Figure 1:
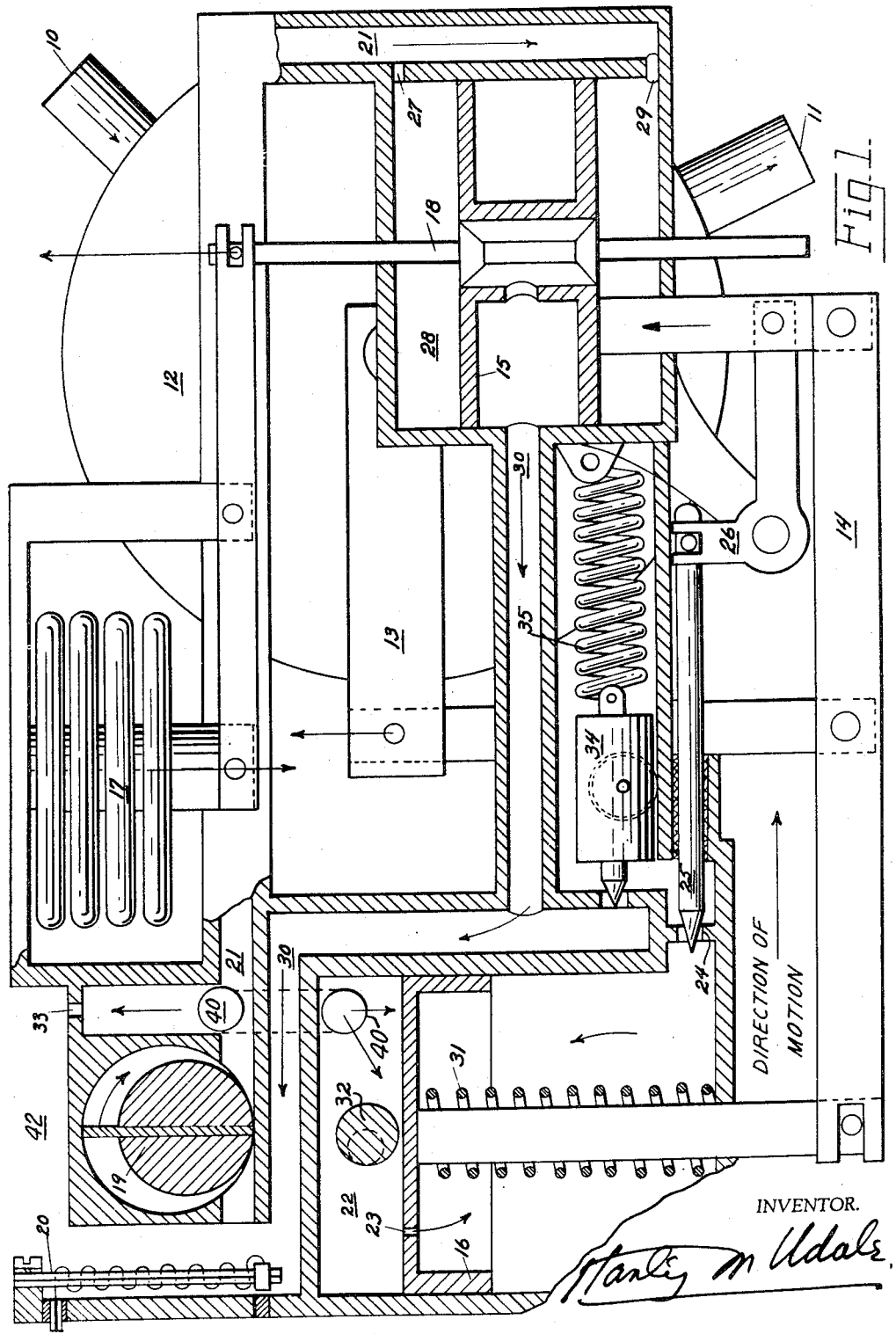
Fig. 1 shows diagrammatically the preferred form of my invention.

In Fig. 1, 10 is the fuel entrance, 11 is the fuel exit to the engine, not shown, 12 is an engine-driven fuel pump, which delivers each revolution an amount of fuel determined by the position of the control lever 13, 14 is a lever connected at one end to a barometric-responsive servomotor piston 15 and at the other end to the engine speed-responsive piston 16.

An altitude or barometric element 17 is arranged so as to move the servomotor valve 18, which controls the movement of the piston 15 in a well-known manner. An engine-driven pump 19 circulates operating oil past a temperature-responsive heating element 20. This operating oil operates in a closed system out of communication with the fuel oil system and is used only as part of the hydraulic or servomotor control system. When viscosity is high and temperature low, element 20 operates so that the effect of viscosity is temporary and is quickly corrected because of the electric heat available when the temperature is low and also because the operating oil is selected so as not to be too sensitive to temperature changes as far as viscosity is concerned. The element 20 is of a well known type in which a bimetallic element is heated by electricity until the circuit is broken by the deflection of the bimetallic element and thus the flow of electricity is discontinued whenever the temperature in the reservoir 42 exceeds a predetermined minimum temperature.

This oil under pressure from pump 19 is conveyed through a passage 21 and a bypass 40 to cylinder 22 above speed-responsive piston 16. A restricted opening 23 in piston 16 allows this oil to flow past a needle 25 in outlet 24. The needle 25 is controlled by lever 26, which is moved by the servomotor piston 15.

A restricted inlet 27, above the piston 15, leads from the oil pressure passage 21 into cylinder 28. A restricted passage 29 admits oil under pressure beneath the piston 15 from the passage 21. An outlet passage 30 delivers the oil back to the reservoir from the central recess portion of the piston 15 whenever the valve 18 moves away from its neutral position in which it is shown. Whenever the valve 18 departs from its neutral position relative to the piston 15 oil under pressure flows from one or the other end of the cylinder 28, through one or the other of the two restrictions 27 or 29 and then past the valve 18 to the passage 30 and so back to the reservoir 42. This valve 18 is just small enough to move freely through the central opening in the piston 15 but is large relative to the orifices 28 and 29. Passage 30 also delivers the oil flowing past the needle valve 25 from the cylinder 22, which flows through the opening 23 and past the piston 16.

The pressure generated by the pump 19 is determined largely by the restriction 33, which is considerably larger than the restriction 23. The oil under pressure in chamber 22 compresses a spring 31, which supports piston 16. An adjustable stop 32 limits the upward travel of the piston 16.

Figure 2:
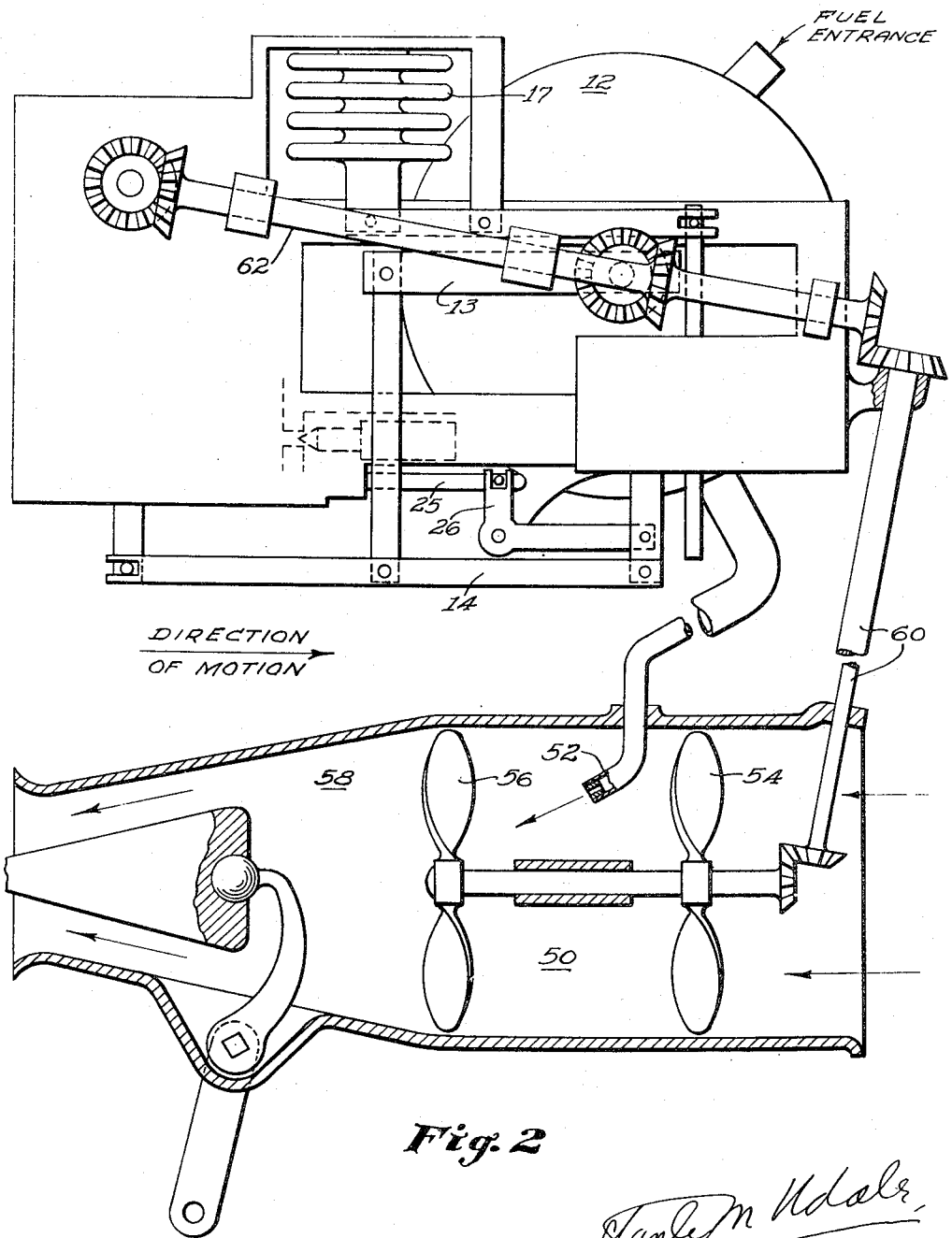
Fig. 2 shows the control applied to a well known type of airplane engine.

An inertia-responsive valve 34 is shown in the position it assumes at low acceleration when it is held open by the spring 35, which spring is overcome by acceleration above a predetermined value, which value is set by the stiffness of spring 35. The direction of motion is to the right as shown by the arrow below the needle 25. Hence, during acceleration, the inertia valve 34 moves to the left, stretching the spring 35 and preventing the flow past the needle 25. The pressure below the piston 16 then becomes equal to the pressure above the restriction 23. The spring 31 then raises the piston 16 against the stop 32, which raises the left-hand end of the lever 14, which raises the lever 13 clockwise, which reduces the discharge from the fuel pump 12, so that during acceleration to the right, the left-hand of the lever 14 is held in the position corresponding to a minimum revolution per minute of the pump 19 as far as the speed control is concerned. The servomotor valve 18 is first moved by the barometric elements 17 and the piston 15 follows, being moved hydraulically by the pressure difference resulting from the displacement of valve 18 until the piston is restored to the neutral position relative to its servomotor valve 18. When the piston 16 seats on the stop 32 the fuel supply per revolution is held at a low value and the fuel supply is controlled solely by the barometrically-responsive servomotor valve 18 and its piston 15. In Fig. 2, 50 is the combustion chamber. 52 is the fuel nozzle connected to the outlet 11 of the fuel pump 12. 54 is the air compressor supplying compressed air to the combustion chamber 50. 56 is the gas turbine driving the compressor 54. 58 is the conical outlet from the gas turbine. 60 and 62 are the drive shafts to the fuel pump 12 and to the oil pump 19.

Operation

During acceleration to the right, the mixture is held lean and the tendency to overspeed is reduced because the flow through 23 in the piston 16 is checked by the travel of the inertia valve 34 to the left. When the speed of the engine is constant the fuel required at that speed is selected by the speed and by the air density on the assumption that at every speed and at each altitude there is a definite amount of fuel that can safely be burnt. The pump 12 being rotated at engine speed (or at a fraction thereof) discharges fuel at a rate proportionate to speed. The barometric elements 17 move the servomotor valve 18 which controls the movement of its servile piston 15 which controls the stroke of the pump through the lever 13. The downward movement of the piston 16 also controls the stroke of the pump through the lever 13. When the inertia valve 34 moves to the left therefore, the piston 16 no longer responds to speed but to the spring 31 which causes the piston 16 to engage with the adjustable stop 32. Thus the rise of the piston 16 tends to reduce the fuel per revolution when the acceleration exceeds a safe figure. The expansion of the element 17 with altitude tends to decrease the fuel flow per revolution. Normally, when running at any constant speed, the position of the lever 14 is determined by the altitude, because as the altitude increases, the element 17 expands downwards and the servomotor valve 18 rises and the piston 15 also rises due to the action of the valve 18 releasing the pressure in cylinder 28. The two restricted openings 27 and 29 ensure that the pressure above and below the piston 15 are always the same when the valve 18 is in the neutral position (in which it is shown) as then the leakage past both the upper and low portions of valve 18 causes equal flow through 27 and 29 which are of equal size. The slightest departure of the servomotor valve 18 from this neutral position upsets the equilibrium, as once the valve 18 descends there is a flow through the opening 29 many times greater than the flow due to leakage through 27 and then the pressure below the piston immediately falls and the piston 15 descends quickly until the valve 18 is once more in the neutral position in which it is shown when the descent of the piston 15 is checked. Therefore, the lever 13 is moved clockwise by the link 14 to reduce fuel flow at altitude. For a similar reason, if the engine speeds up above a predetermined speed, the piston 16 departs from the stop 32 and the lever 14 is moved down and the lever 13 is moved counter-clockwise to increase fuel flow. Hence, at high speed, the discharge from pump 12 is determined by the altitude and by the speed of the engine. During acceleration, altitude is the only variable which controls fuel discharge per revolution of the engine as the speed is no longer a factor as the inertia valve 34 neutralizes the speed control of the fuel pump 12. The engine can be either an internal or an external combustion engine. The most modern engines in use today in airplanes are of the external type. The external combustion engines in use today on airplanes are almost always gas turbines.

The fuel flow control lever 13 and hence the fuel flow per revolution is thus responsive to:

(a) Altitude through the barometric element 17, servomotor valve 18 and servomotor piston 15.

(b) Engine revolutions per minute through the piston 16, restriction 23 and needle valve 25, which in its turn is controlled by the altitude responsive piston 15.

(c) Acceleration which renders (b) inoperative so that during acceleration, the fuel flow per revolution is controlled only by the altitude This device is particularly adapted to control the fuel supply to a gas turbine in which the turbine drives the oil pump 19 and the fuel pump 12 at a speed proportional to the speed of the turbine. Gas turbines are particularly susceptible to excessive speeds.

What I claim is:

Fuel control means for an engine having an engine driven fuel metering pump for supplying fuel to the engine when driving an airplane comprising engine speed responsive means driven by said engine and connected to said pump so as to increase its delivery as the speed of the engine increases, a barometric element also connected to said pump and adapted to decrease the delivery of said pump as the altitude increases, inertia responsive means responsive to the acceleration of the airplane adapted to render the speed responsive means temporarily less effective during acceleration.

STANLEY M. UDALE.

REFERENCES CITED

The following references are of record in the file of this patent:

UNITED STATES PATENTS

| Number | Name | Date |
|---|---|---|
| 2,276,794 | Ricci | Mar. 17, 1942 |
| 2,278,493 | Samiran et al. | Apr. 7, 1942 |
| 2,296,876 | Samiran et al. | Sept. 29, 1942 |
| 2,353,269 | Roth et al. | July 11, 1944 |

FOREIGN PATENTS

| Number | Country | Date |
|---|---|---|
| 526,988 | Great Britain | Sept. 30, 1940 |